United States Patent
Grobe et al.

(10) Patent No.: US 9,455,613 B2
(45) Date of Patent: Sep. 27, 2016

(54) ROTOR WINDING HAVING A BRAZE JOINT SPACED APART FROM STRESS CONCENTRATION

(71) Applicant: Siemens Energy, Inc., Orlando, FL (US)

(72) Inventors: Mark A. Grobe, Fort Payne, AL (US); David Earl Hulsey, Fort Payne, AL (US); James V. Johnson, Fyffe, AL (US); Robert F. Lemke, Gastonia, NC (US); Robert W. Ralph, Oviedo, FL (US); Christian T. Schneider, Winter Springs, FL (US); Stephen T. Soto, Charlotte, NC (US); Randy Edward Whitener, Oviedo, FL (US); Larry L. Zeller, Rock Hill, SC (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 14/325,413

(22) Filed: Jul. 8, 2014

(65) Prior Publication Data
US 2015/0028702 A1 Jan. 29, 2015

Related U.S. Application Data

(60) Provisional application No. 61/857,406, filed on Jul. 23, 2013.

(51) Int. Cl.
| | | |
|---|---|---|
| *H02K 3/04* | (2006.01) | |
| *H02K 3/00* | (2006.01) | |
| *H02K 1/28* | (2006.01) | |
| *H02K 15/04* | (2006.01) | |
| *H02K 3/12* | (2006.01) | |
| *H02K 3/24* | (2006.01) | |
| *H02K 3/51* | (2006.01) | |

(52) U.S. Cl.
CPC ............ *H02K 15/0414* (2013.01); *H02K 3/12* (2013.01); *H02K 3/24* (2013.01); *H02K 3/51* (2013.01); *Y10T 29/49012* (2015.01)

(58) Field of Classification Search
CPC ............ H02K 3/04; H02K 3/12; H02K 3/22
USPC ........................................ 310/198, 201, 26.11
See application file for complete search history.

(56) References Cited

U.S. PATENT DOCUMENTS

| | | | | |
|---|---|---|---|---|
| 3,176,176 A | * | 3/1965 | Willyoung | ............... H02K 3/51 310/208 |
| 4,321,497 A | * | 3/1982 | Long | ...................... H02K 3/12 310/198 |
| 6,087,745 A | * | 7/2000 | Dreher | .................... H02K 3/22 310/270 |
| 6,798,101 B1 | * | 9/2004 | Tekawade | ................ H02K 3/12 310/270 |

FOREIGN PATENT DOCUMENTS

JP 59123438 A * 7/1984

* cited by examiner

*Primary Examiner* — Jose Gonzalez Quinones

(57) ABSTRACT

A winding for a rotor for use in an electrical generator utilized in the power generation industry. The winding includes a plurality of axial sections and a plurality of transversely oriented end arc sections. An integrated leg section extends from each end arc section to form an associated corner section at an intersection of each leg section and associated end arc section. Each leg section is affixed to an associated axial section at a joint that is spaced apart from an associated corner section such that the joint is not subjected to stress concentration which occurs at the associated corner section.

20 Claims, 3 Drawing Sheets

ROTOR WINDING HAVING A BRAZE JOINT SPACED APART FROM STRESS CONCENTRATION

CROSS REFERENCE TO RELATED APPLICATIONS

This application claims the benefit under 35 U.S.C. §119(e) of U.S. Provisional Application No. 61/857,406 entitled MACHINED END ARC TO RELOCATE ROTOR WINDING BRAZE JOINTS, filed on Jul. 23, 2013, which is incorporated herein by reference in its entirety.

FIELD OF THE INVENTION

The invention relates to a winding for a rotor used in an electrical generator for the power generation industry, and more particularly, to a winding having a braze joint that is spaced apart from a corner section such that the braze joint is not subjected to stress concentration which occurs at the corner section.

BACKGROUND OF THE INVENTION

Electrical generators utilized in the power generation industry include a rotor and a winding. Referring to FIG. 1, a partial view of a rotor 10 is shown which is configured for rotation about a longitudinal axis 12. The rotor 10 includes a substantially cylindrically shaped rotor body 14 and two rotor shaft extensions 16, which extend axially from the rotor body 14 along the longitudinal axis 12. An outer periphery of the rotor body 14 includes a plurality of axially extending slots 18, which extend the complete length of the rotor body 14. The rotor 10 also includes a winding 20, which includes a plurality of straight axial sections 22 each connected to an associated arc shaped end turn or end arc section 24 that is oriented transverse to its associated straight section 22. A plurality of straight sections 22 is located in each slot 18 such that the straight sections 22 and the end arc sections 24 form a stacked or layered arrangement. The straight sections 22 and associated end arc sections 24 are each fabricated from copper.

In many generators currently in use, each straight section 22 is affixed to an associated end arc section 24 by a weld joint known as a square corner braze joint. Referring to FIG. 2, a square corner braze joint 26 is shown. A square corner braze joint 26 is the location at which a straight section 22 is brazed to a side of an end arc section 24 to form a braze joint 28. The straight section 22 and end arc section 24 form a sharp corner 29 that coincides with the braze joint 28. In addition, a braze filler material used to form the braze joint 28 forms a radius 30 at the corner 29. Square corner braze joints 26 were first implemented as a cost reduction measure and have been commonplace for many years. Further, square corner braze joints 26 were implemented as part of a change away from a bent end arc design in order to provide a higher rating due to improved cooling and increased cross section size of the end arc.

An alternative end arc configuration is shown in FIG. 3. FIG. 3 shows a plurality of end arcs 32 known as bent end arcs 32. In this configuration, the straight sections 22 of the winding 20 are made longer and then bent at a predetermined angle at first locations 33. A braze joint 34 is then formed between left 35 and right 36 halves of the winding 20 in a center of each bent end arc 32. However, conversion of a square corner braze joint 26 to a bent end arc 32 configuration has drawbacks. At the outset, substantially all of the straight sections 22 and the end arc sections 24 in an existing rotor 10 would have to be replaced. In addition, new rotor ventilation and insulation schemes must be designed and manufactured. Further, manufacturing is more complicated since the straight sections must be worked into intricate geometries. Another drawback is that the upgraded cooling designs of the end arc such as providing larger cross sections with or without intercooled end arcs cannot be manufactured using a bent end arc design.

SUMMARY OF INVENTION

It has been found by the inventors herein that a square corner braze joint may be susceptible to crack initiation and propagation at a braze joint due to mechanical stress concentration at a corner resulting from the geometry of the components and material property differences between copper and braze alloy.

A winding for a rotor used in an electrical generator for the power generation industry is disclosed. The winding includes a plurality of axial sections and a plurality of transversely oriented end arc sections. A leg section extends from each end arc section to form an associated corner section at an intersection of each leg section and associated end arc section. A radius is formed at each corner section in order to reduce stress concentration. Each leg section is affixed to an associated axial section at a joint that is spaced apart from an associated corner section such that the joint is not subjected to stress concentration which occurs at the associated corner section. The winding may be used in a rotor having a rotor body which includes a plurality of slots. A plurality of axial sections is located within each slot of the rotor body to form a stacked or layered arrangement.

The respective features of the present invention may be applied jointly or severally in any combination or sub-combination by those skilled in the art.

BRIEF DESCRIPTION OF DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
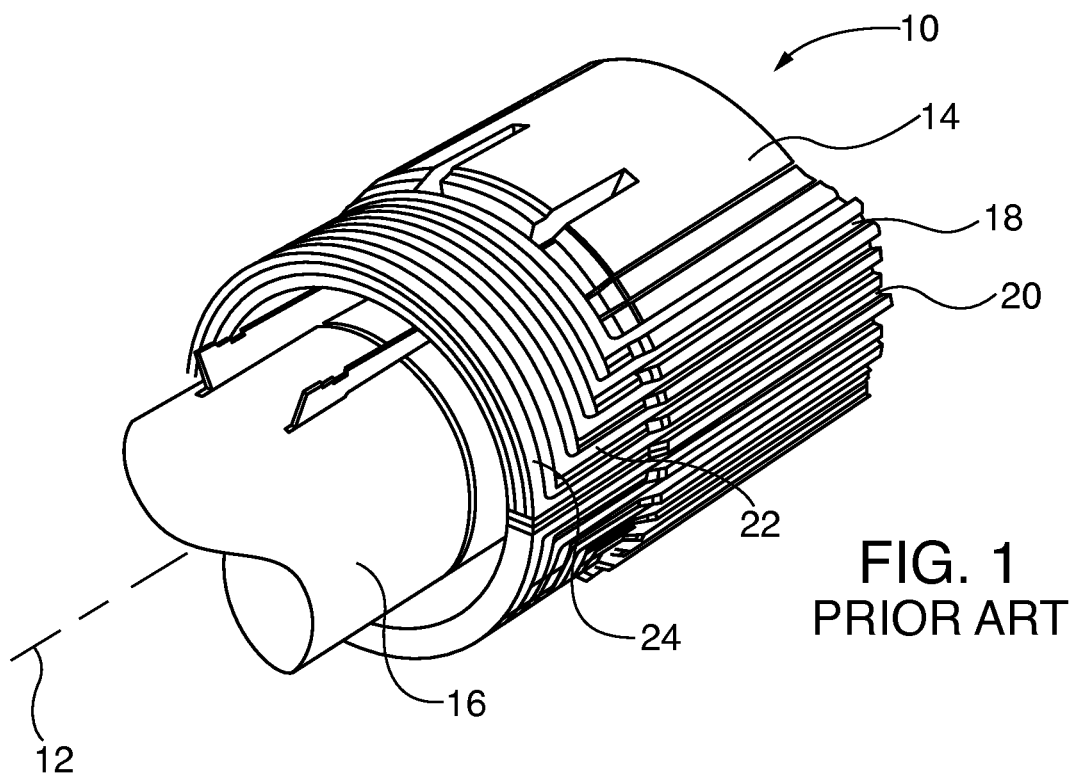
FIG. 1 is a partial view of a rotor for an electrical generator utilized in the power generation industry.
Figure 2:
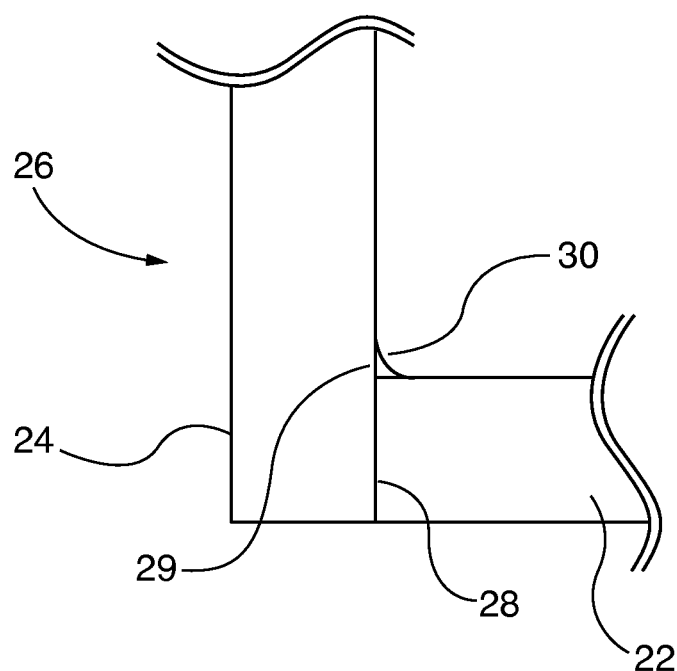
FIG. 2 depicts a square corner braze joint.
Figure 3:
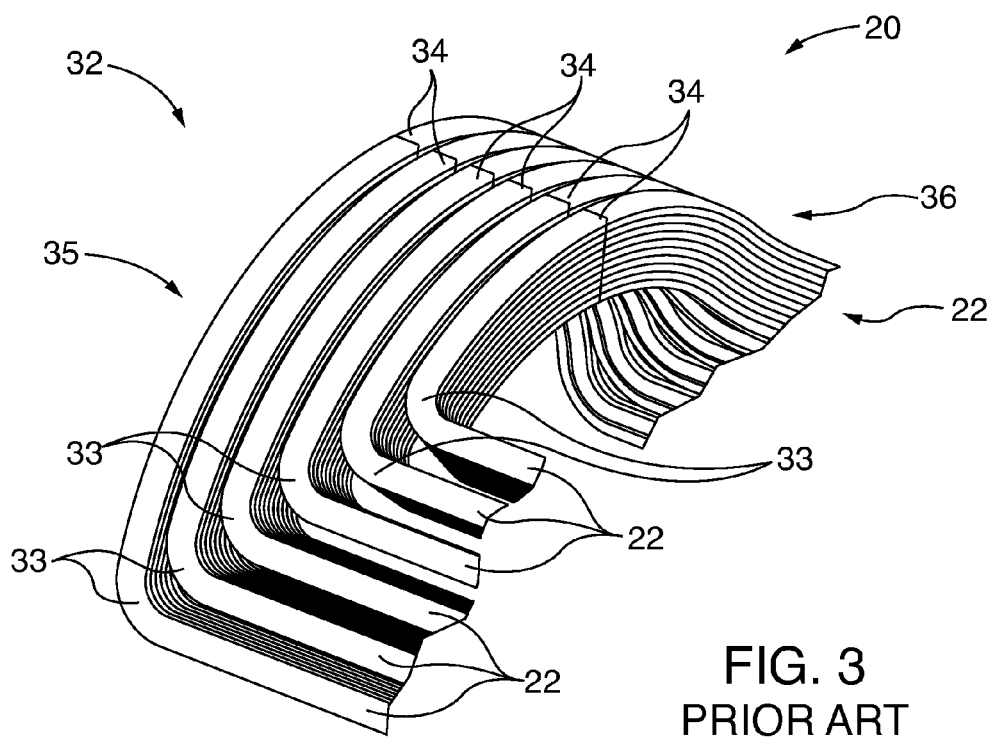
FIG. 3 shows a bent end arc configuration used in a rotor winding.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

It has been found by the inventors herein that a square corner braze joint 26 may be susceptible to crack initiation and propagation at the braze joint 28 due to mechanical stress concentration at the corner 29 resulting from the geometry of the components and material property differences between copper and braze alloy.

Figure 4:
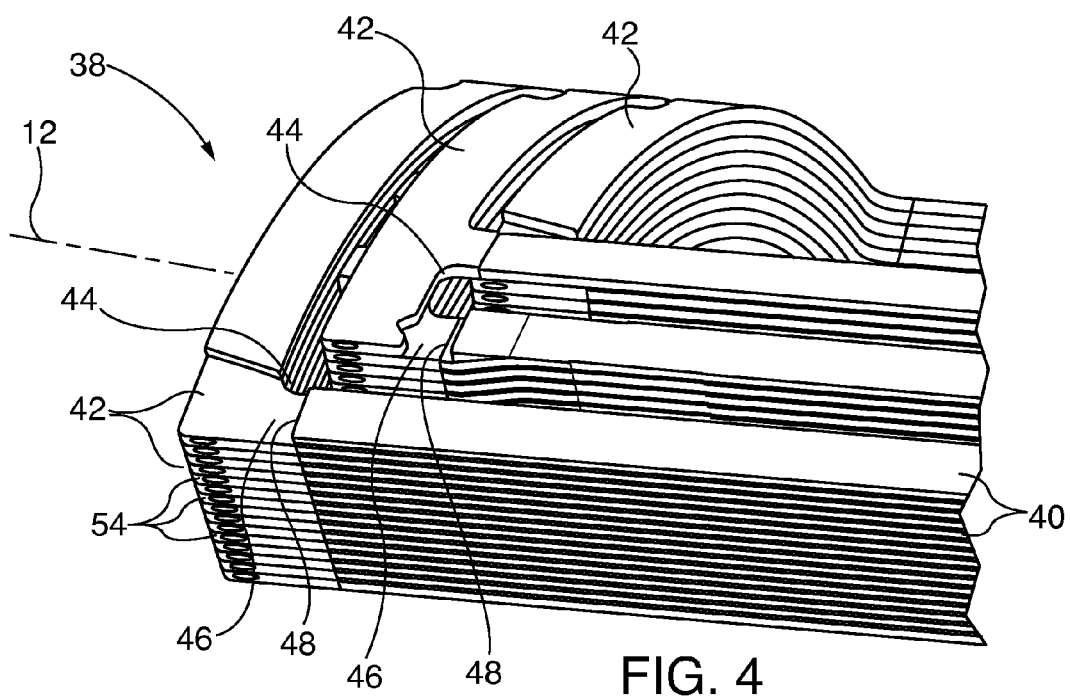
FIG. 4 is a partial view of a winding in accordance with the present invention.

Referring to FIG. 4, a partial view of a winding 38 in accordance with the present invention is shown. The winding 38 may be used in a rotor, for example rotor 10 shown in FIG. 1, of an electrical generator of the type utilized in the power generation industry. The winding 38 includes a plurality of straight axial sections 40 each associated with an end arc section 42 that is oriented transverse to its associated straight section 40. A leg section 46 extends from each end arc section 42 in an axial direction. The leg section 46 and end arc section 42 are formed as a one-piece configuration, i.e. the leg section 46 and end arc section 42 are integrally or unistructurally formed thereby thrilling an integrated leg section 46. A corner section 44 is formed at an intersection of each leg section 46 and associated end arc section 42. The straight sections 40, end arc sections 42 and leg section 46 may each be shaped as a strap. In use, a plurality of straight sections 40 is located in each slot of a rotor, for example slot 18 of rotor 10 shown in FIG. 1, such that the straight sections 40, the end arc sections 42 and leg sections 46 form a stacked or layered strap arrangement.

Each end arc section 42 is fabricated from either a hot extruded or cold drawn copper bar or plate and each integrated leg section 46 may be formed by a machining process. A straight section 40, which is fabricated from copper, is then brazed to each leg section 46 to form a braze joint 48. It is understood that other techniques may be used to affix the leg sections 46 to associated straight sections 40.

Figure 5:
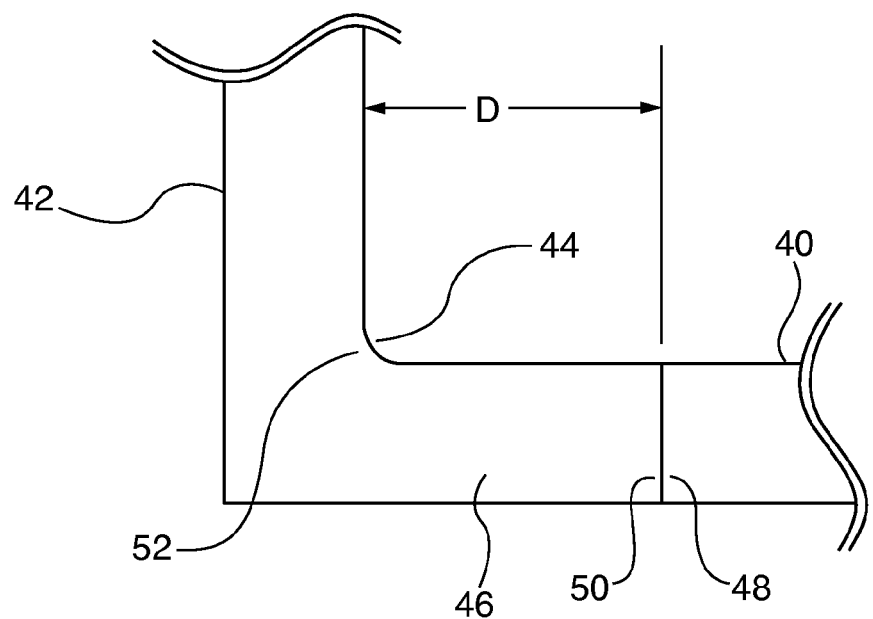
FIG. 5 is an isolated view of a leg section, straight section, corner section and associated braze joint of winding in accordance with the present invention.

Referring to FIG. 5, an isolated view of an end arc section 42, leg section 46, straight section 40, corner section 44 and associated braze joint 48 is shown. The leg section 46 extends away from the corner section 44 and toward the straight section 40. As previously described, the leg section 46 and end arc section 42 are formed as a one-piece configuration, i.e. the leg section 46 and end arc section 42 are integrally or unistructurally formed thereby forming an integrated leg section 46. An end 50 of the leg section 46 is brazed to the straight section 40 to form the braze joint 48 thus spacing the braze joint 48 from the corner section 44 in an axial direction. The leg section 46 is of sufficient length such that the braze joint 48 is sufficiently spaced apart from the corner section 44 so that the braze joint 48 is not subjected to any stress concentration which occurs at the corner section 44 or in proximity to the corner section 44. This substantially increases braze joint life and reduces the likelihood of failure of the braze joint 48. The actual distance between the braze joint 48 and the corner section 44 is dependent on the width of the copper extrusion that is used as well as the length needed such that braze joint 48 is not subjected to stress concentration from the corner section 44. In one embodiment, the braze joint 48 is located a minimum distance D from the corner section 44 that is sufficient to ensure that the braze joint 48 is not subjected to stress concentration from the corner section 44. Further, a radius 52 is machined into the corner section 44 in order to reduce stress concentration at the corner section 44.

The end arcs 42 of the current invention may also be used to repair or retrofit a winding currently in use in an electrical generator. Referring back to FIG. 4, each of the end arcs 42 may include a cooling channel 54 to enable use of the winding 38 with blocking and ventilation path configurations of existing intercooled generator rotors, thus minimizing the number of newly designed or redesigned components that are needed. Alternatively, the end arcs 42 do not include cooling channels 54 to form solid end arcs. Installation of the end arcs 42 enables reuse of a substantial portion of existing straight section copper in a generator rotor or minimizes the replacement of copper straps. Further, the current invention enables continued use of a known rectangular winding assembly used in generator rotors.

Figure 6:
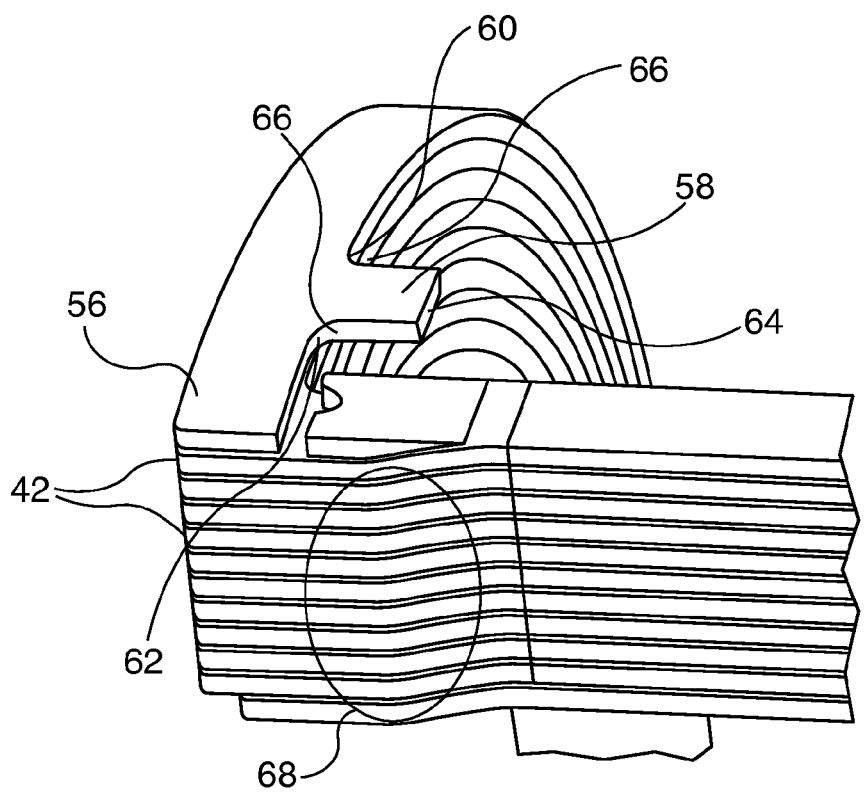
FIG. 6 is an isolated view of an outermost end arc and depicts an extended crossover leg section.

Referring to FIG. 6, an isolated view of the end arcs 42 is shown. An outermost end arc 56 includes an extended crossover leg section 58 having an end 64 used for connection to a coil crossover at a crossover braze joint. The crossover leg section 58 is oriented transverse to the end arc section 56. Upper 60 and lower 62 corner sections are formed at an intersection of the crossover leg section 58 and the end arc section 56. The crossover leg section 58 extends away from the upper 60 and lower 62 corner sections thus locating a crossover braze joint away from the upper 60 and lower 62 corner sections. The crossover leg section 58 is of sufficient length such that the crossover braze joint is sufficiently spaced apart from the upper 60 and lower 62 corner sections so that the crossover braze joint is not subjected to stress concentrations which occurs at the upper 60 and lower 62 corner sections thereby increasing joint life. Further, a radius 66 is machined into the upper 60 and lower 62 corner sections in order to reduce stress concentration at the upper 60 and lower 62 corner sections. Each layer of copper strap in the winding either steps down or up a layer for each turn to form corresponding transition sections 68. The transition sections 68 may be located in either the end arcs 42 or the straight sections 22 or both the end arcs 42 and the straight sections 22. The actual length of the crossover leg section 58 that is used is dependent on the existing design of the winding and the location of transition sections 68. In particular, the crossover leg section 58 is of sufficient length such the crossover braze joint is not subjected to stress concentration from the upper 60 and lower 62 corner sections.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A winding for a rotor having a rotor body, comprising:
   a plurality of first axial sections located in a first slot of the rotor body;
   a plurality of second axial sections located in a second slot of the rotor body;

a plurality of end arc sections, wherein each end arc section is oriented transverse to an associated axial section; and first and second integrated leg sections that extend from each end arc section to form associated first and second corner sections, respectively, wherein the first and second leg sections are affixed to associated first and second axial sections located in the first and second slots, respectively, at first and second joints, respectively, wherein the first and second joints are spaced apart from the first and second corner sections, respectively, by a distance such that the first and second joints are not subjected to stress concentration which occurs at the first and second corner sections, respectively, thereby connecting each end arc section between an associated first axial section in the first slot and an associated second axial section in the second slot.

2. The winding according to claim 1, wherein the first and second joints are spaced apart from the associated corner section by a minimum distance sufficient to ensure that the first and second joints are not subjected to stress concentration from the corner section.

3. The winding according to claim 1, wherein the first and second joints are formed by brazing.

4. The winding according to claim 1, wherein the axial, end arc, and leg sections are fabricated from copper.

5. The winding according to claim 1, wherein either the end arc sections or axial sections or both the end arc and axial sections each include a transition section.

6. The winding according to claim 1, further including a radius at each corner section for reducing stress concentration.

7. The winding according to claim 1, wherein each end arc includes a cooling channel.

8. A rotor for use in a generator, comprising:
a rotor body having a shaft;
a plurality of slots formed in the rotor body;
a plurality of axial sections located within each slot;
a plurality of end arc sections, wherein each end arc section is oriented transverse to an associated axial section;
first and second leg sections integrally formed with each end arc section wherein each leg section extends from each end arc section to form associated first and second corner sections, respectively, wherein the first and second leg sections are affixed to associated first and second axial sections located in first and second slots, respectively, at first and second joints, respectively, wherein the first and second joints are spaced apart from the first and second corner sections, respectively, by a distance such that the first and second joints are not subjected to stress concentration which occurs at the first and second corner sections, respectively, thereby connecting each end arc section between an associated first axial section in the first slot and an associated second axial section in the second slot.

9. The rotor according to claim 8, wherein the first and second joints are spaced apart from the associated corner section by a minimum distance sufficient to ensure that the first and second joints are not subjected to stress concentration from the corner section.

10. The rotor according to claim 8, wherein the first and second joints are formed by brazing.

11. The rotor according to claim 8, wherein the axial, end arc and leg sections are fabricated from copper.

12. The rotor according to claim 8, wherein either the end arc sections or axial sections or both the end arc and axial sections each include a transition section.

13. The rotor according to claim 8, further including a radius at each corner section for reducing stress concentration.

14. The rotor according to claim 8, wherein each end arc includes a cooling channel.

15. A method for forming a winding for a rotor having a rotor body, comprising:
providing a plurality of first axial sections located in a first slot of the rotor body;
a plurality of second axial sections located in a second slot of the rotor body;
providing a plurality of end arc sections, wherein each end arc section is oriented transverse to an associated axial section;
providing first and second integrated leg sections that extend from each end arc section to form associated first and second corner sections, respectively;
affixing the first and second leg sections to associated first and second axial sections located in the first and second slots, respectively, at first and second joints, respectively, thereby connecting each end arc section between an associated first axial section in the first slot and an associated second axial section in the second slot; and
locating the first and second joints at a position which is spaced apart in an axial direction by a distance from associated first and second corner sections, respectively, such that the first and second joints are not subjected to stress concentration which occurs at the associated first and second corner sections, respectively.

16. The method according to claim 15, wherein the first and second joints are spaced apart from the associated corner section by a minimum distance sufficient to ensure that the first and second joints are not subjected to stress concentration from the corner section.

17. The method according to claim 15, wherein the first and second joints are formed by brazing.

18. The method according to claim 15, wherein the axial, end arc and leg sections are fabricated from copper.

19. The method according to claim 15, wherein either the end arc sections or axial sections or both the end arc and axial sections each include a transition section.

20. The method according to claim 15, further including a radius at each corner section for reducing stress concentration.

* * * * *